United States Patent Office 2,839,446
Patented June 17, 1958

2,839,446
NEW PYRIMIDINE DERIVATIVES

Alfred Margot and Hans Gysin, Basel, Switzerland, assignors to J. R. Geigy A.-G., Basel, Switzerland, a Swiss firm No Drawing. Application February 8, 1957
Serial No. 638,922

Claims priority, application Switzerland February 15, 1956

6 Claims. (Cl. 167—33)

The present invention concerns a process for the production of new pyrimidine derivatives. It also concerns fungicidal agents which contain such compounds as active ingredients and their use in the control of fungi.

It has surprisingly been found that pyrimidine derivatives of the general formula:

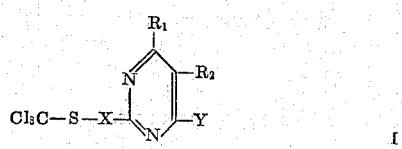

wherein $R_1$ represents a low molecular alkyl radical, $R_2$ represents hydrogen, a low molecular alkyl radical or, together with $R_1$, the trimethylene or tetramethylene radical or a fused benzene ring, X represents O or S, and Y represents a trichloromethane sulphenyl group bound by way of O or S, the hydroxyl group, halogen, hydrogen or a low molecular alkyl group, have an excellent fungicidal activity and that they can be produced in a simple manner. The pyrimidine derivatives defined above are obtained by reacting perchloromethylmercaptan (trichloromethane sulphenyl chloride) with a pyrimidine derivative of the general formula:

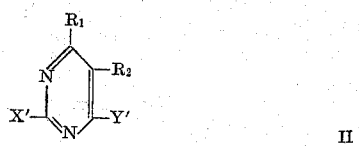

and then, if desired, replacing any hydroxyl group Y' present by halogen by treating with an inorganic acid halide or, after conversion into the group —OM, reacting it with further perchloromethylmercaptan thus converting it into the group —O—S—CCl$_3$. In the above general Formula II:

$R_1$ and $R_2$ have the meanings given above
X' represents the mercapto group, the group —SM or —OM wherein M represents an alkali metal ion, and
Y' represents the mercapto group, the hydroxyl group, the group —SM or —OM, hydrogen or a low molecular alkyl group Naturally an —OM group cannot occur together with a free mercapto group.

The reaction can be performed in inert organic solvents such as, e. g. chloroform, benzene or toluene and, if only mercapto or mercaptide groups (—SM) have to be reacted, it can also be performed in water. In this reaction compounds with free mercapto groups react under liberation of hydrogen chloride whilst free hydroxy groups remain unchanged.

The conversion of a free mercapto group before the reaction with perchloromethylmercaptan into an —SM group is only necessary when an —OM group has to be reacted in the same step with perchloromethylmercaptan as, in the formation of the salts, the hydrogen atom of the hydroxyl group is only replaced by M after that of the mercapto group.

Examples of suitable starting materials of the general Formula II are:

2-mercapto-4-methyl pyrimidine
2-mercapto-4,6-dimethyl pyrimidine
2,6-dihydroxy-4-methyl pyrimidine (methyluracil)
2-mercapto-4-methyl-6-hydroxy pyrimidine (methyl thiouracil)
2-mercapto-4-methyl-5-ethyl-6-hydroxy primidine
2-mercapto-4-ethyl-5-methyl-6-hydroxy pyrimidine
2-mercapto-4,5-trimethylene-6-hydroxy pyrimidine
2-mercapto-4,5-tetramethylene-6-hydroxy pyrimidine
2-mercapto-4,5-benzo-6-hydroxy pyrimidine, and
2,6-dimercapto-4-methyl pyrimidine Also isomeric and homologous pyrimidine compounds can be used such as are obtained, for example by condensation of thioureau or isothiourea ethers on the one hand, suitable β-dioxo compounds or β-keto carboxylic acid esters on the other, and then, if necessary, hydrolysis of an alkylmercapto group in the 2-position or replacement of a hydroxyl group in the 6-position by the mercapto group.

The following examples serve to further illustrate the production of the new compounds. Parts are given as parts by weight; their relationship to parts by volume is as that of grammes to cubic centimetres. The temperatures are in degrees centigrade.

*Example 1*

186 parts of perchloromethyl mercaptan are poured while stirring well at 20–30° into a mixture of 142 parts of 2-mercapto-4-methyl-6-hydroxy pyrimidine and 700 parts by volume of benzene. If necessary the mixture is gently cooled during the addition. The whole is then stirred for a further 5 hours at room temperature, 400 parts of water are added and stirring is continued for another 8 hours at the same temperature. The reaction product is then filtered off under suction and washed with water and then washed three to four times with about 50 parts by volume of isopropanol each time. 2-trichloromethane sulphenylmercapto-4-methyl-6-hydroxy pyrimidine (M. P. 149–150° on decomposition) is obtained in a very good yield. The following compounds can be produced for example in an analogous manner:

2-trichloromethane sulphenylmercapto-4-methyl pyrimidine, M. P. 67–68°
2-trichloromethane sulphenylmercapto-4.6-dimethyl pyrimidine
2-trichloromethane sulphenylmercapto-4.5-dimethyl-6-hydroxypyrimidine
2-trichloromethane sulphenylmercapto-4-methyl-5-ethyl-6-hydroxypyrimidine
2 - trichloromethane sulphenylmercapto - 4.5 - benzo-6-hydroxy pyrimidine, M. P. 173°
2 - trichloromethane sulphenylmercapto - 4.5 - benzo-6 - trichloromethanesulphenyloxy - pyrimidine, M. P. 142–144°
2 - trichloromethane sulphenylmercapto - 4.5 - tetramethylene-6-hydroxy-pyrimidine
2-trichloromethane sulphenylmercapto-4.5-trimethylene-6-hydroxy-pyrimidine
2-trichloromethane sulphenylmercapto-4-ethyl-5-methyl-6-hydroxy-pyrimidine
2,6-bis-trichloromethane sulphenylmercapto-4-methyl pyrimidine, M. P. 84–86°

*Example 2*

A mixture of 29 parts of the 2-trichloromethane sulphenylmercapto-4-methyl-6-hydroxy pyrimidine described in Example 1 and 80 parts of phosphorus oxychloride is boiled under reflux for some hours and, after cooling, the reaction product is poured on to ice. The precipitate obtained is filtered off under suction, washed with water and dried. The product so obtained is stirred warm with chloroform and the solution is filtered to remove some undissolved dark resinous products. On concentrating, the 2-trichloromethane sulphenylmercapto-4-methyl-6-chloro-pyrimidine crystallises out in the form of needles.

Recrystallised from isopropyl alcohol, the pale yellowish product melts at 63°.

Example 3

14.2 parts of 2-mercapto-4-methyl-6-hydroxy pyrimidine and 25 parts of potash in 200 parts of benzene are boiled under reflux for 12 hours, the water produced being azeotropically distilled off and removed. After adding 37 parts of perchloromethyl mercaptan, the whole is boiled under reflux for another 12 hours. It is allowed to cool, water is added and the layers are separated. The benzene layer is washed with water and dried over sodium sulphate. After distilling off the benzene, a residue of a honey-like consistency remains which crystallises on rubbing with cyclohexane. The 2-trichloromethane sulphenylmercapto - 4 - methyl - 6-trichloromethane sulphenyloxy pyrimidine so obtained in good yield, melts, on recrystallising from cyclohexane, at 124–125°.

Example 4

17.0 parts of the disodium salt of 2.6-dihydroxy-4-methyl pyrimidine (methyluracil) which can be produced, for example, by dissolving 12.6 parts of methyl uracil in two equivalents of caustic soda lye and evaporating the solution to complete dryness, are suspended in 150 parts of abs. benzene. 37 parts of perchloromethyl mercaptan are added and the mixture is boiled for several hours under reflux while stirring well. It is then allowed to cool, and the product is filtered off under suction from sodium chloride and some side product. The filtrate is washed with water and the solvent is distilled off. 2.6-bis-trichloromethane sulphenyloxy-4-methyl pyrimidine remains as crystallised residue. It can be further purified by recrystallising from cyclohexane or isopropanol and then melts at 114–115°.

The new pyrimidine derivatives can be used as such or combined with suitable carriers and distributing agents as well as possibly with other fungicidal or insecticidal substances for the protection of plants and parts thereof from attack by injurious fungi. They are also suitable, however, for the treatment of organic materials such as, e. g. wood, textiles, furs and leather.

The active substances can be combined, for example, with solid pulverulent carriers such as, e. g. talc, kaolin, bole, bentonite, chalk, ground limestone and the pulverulent fungicides obtained can be made suspendable in water if desired by the addition of wetting and dispersing agents. Also the active substances can be dispersed in water with the aid of suitable emulsifying agents or can be dissolved in organic solvents, e. g. chlorinated hydrocarbons such as trichlorethylene, or in medium petroleum fractions, if necessary with the addition of auxiliary solvents such as acetone or higher ketones. In addition, the active substances can also be used when distributed in the air in the form of aerosols, smoke or steam, in particular, for example in store rooms and greenhouses.

Example 5

2–5 parts of active ingredient, e. g. 2-trichloromethane sulphenylmercapto-4-methyl-6-hydroxy pyrimidine are ground with 98–95 parts of talc. The pulverulent fungicide so obtained can be used, for example, for the disinfection of bedding earth as well as for the dusting of plants or parts thereof such as bulbs and tubers.

If the amount of the active ingredient is increased to 15 parts and some adhesive is added, then a strongly fungicidal dry seed dressing agent is obtained which at the same time is non-toxic and does not affect germination.

Example 6

By grinding together 10 parts of active ingredient, e. g. 2-trichloromethane sulphenylmercapto-4.5-benzo-6-trichloromethane sulphenyloxy-pyrimidine with 82 parts of kaolin or chalk and mixing with 8 parts of wetting and dispersing agents, e. g. 5 parts of sulphite waste liquor and 3 parts of ethylene oxide condensation products of alkyl phenols, a concentrate is obtained which, on mixing with water, produces a fungicidal spraying agent which is excellently suitable for treating the parts of plants above the ground.

Example 7

20 parts of active ingredient, e. g. 2-trichloromethane sulphenylmercapto-4-methyl - 6 - chloro-pyrimidine, 40 parts of xylene and 30 parts of ethylene oxide condensation products of alkyl phenols are mixed and an emulsion concentrate is obtained which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

Example 8

Celery plants are sprayed during growth with a wettable powder containing 0.1% of 2-trichloromethane sulphenylmercapto - 4-methyl-6-hydroxy-pyrimidine as active ingredient. They are protected from attack by celery leaf spot (Septoria apii) to a sufficient degree whilst untreated plants growing by the side of those treated are strongly attacked and on being gathered show on the average a slighter weight of the edible parts.

What we claim is:

1. A pyrimidine derivative corresponding to the formula:

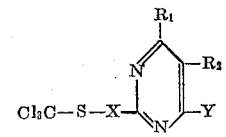

wherein X represents a member selected from the group consisting of O and S, Y represents a member selected from the group consisting of hydrogen, hydroxyl, halogen, lower alkyl, —OSCCl$_3$ and —SSCCl$_3$, R$_1$ taken separately represents a lower alkyl radical, R$_2$ taken separately represents a member selected from the group consisting of hydrogen, and a lower alkyl radical, and R$_1$ and R$_2$ together represent a member selected from the group consisting of the trimethylene, tetramethylene and divinylene radical.

2. 2 - trichloromethane sulphenylmercapto-4.5-benzo-6-trichloromethane sulphenyloxy-pyrimidine.

3. 2 - trichloromethane sulphenylmercapto-4-methyl-6-hydroxy-pyrimidine.

4. 2 - trichloromethane sulphenylmercapto-4-methyl-6-chloro-pyrimidine.

5. A fungicidal agent comprising as essential active ingredient a compound corresponding to the formula

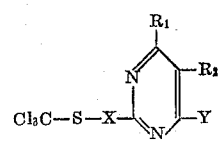

wherein X represents a member selected from the group consisting of O and S, Y represents a member selected from the group consisting of hydrogen, hydroxyl, halogen, lower alkyl, —OSCCl$_3$ and —SSCCl$_3$, R$_1$ taken separately represents a lower alkyl radical, R$_2$ taken separately represents a member selected from the group consisting of hydrogen, and a lower alkyl radical, and R$_1$ and R$_2$ together represent a member selected from the group consisting of the trimethylene, tetramethylene and divinylene radical.

6. The process of controlling fungi which comprises applying to a fungi infested object a compound as defined in claim 1 in an amount and concentration sufficient to inhibit the growth of fungi.

No references cited.